US009325953B2

(12) United States Patent
Cheng

(10) Patent No.: US 9,325,953 B2
(45) Date of Patent: Apr. 26, 2016

(54) SYSTEM AND METHOD FOR SYNCHRONIZING ON-AIR COMMERCIAL PROGRAMMING WITH INTERACTIVE APPLICATIONS

(75) Inventor: Albert Cheng, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 29 days.

(21) Appl. No.: 12/931,949

(22) Filed: Feb. 14, 2011

(65) Prior Publication Data

US 2012/0210339 A1 Aug. 16, 2012

(51) Int. Cl.
*H04N 7/10* (2006.01)
*H04N 7/025* (2006.01)
*H04N 7/52* (2011.01)
*H04N 21/242* (2011.01)
*H04N 21/8545* (2011.01)
*H04N 21/8547* (2011.01)

(52) U.S. Cl.
CPC .............. *H04N 7/52* (2013.01); *H04N 21/242* (2013.01); *H04N 21/8545* (2013.01); *H04N 21/8547* (2013.01)

(58) Field of Classification Search
USPC ............... 725/22–23, 32, 34–36, 60–61, 136
See application file for complete search history.

(56) References Cited

U.S. PATENT DOCUMENTS

| | | | |
|---|---|---|---|
| 5,138,649 A | 8/1992 | Krisbergh | |
| 5,410,326 A | 4/1995 | Goldstein | |
| 6,069,672 A | 5/2000 | Claassen | |
| 7,191,247 B1 | 3/2007 | Philyaw | |
| 2002/0004748 A1 | 1/2002 | Koga | |
| 2002/0162120 A1 | 10/2002 | Mitchell | |
| 2005/0177861 A1* | 8/2005 | Ma et al. ....................... | 725/135 |
| 2007/0089158 A1 | 4/2007 | Clark | |
| 2007/0130580 A1* | 6/2007 | Covell et al. .................... | 725/18 |
| 2008/0052169 A1* | 2/2008 | O'Shea et al. .................. | 705/14 |
| 2009/0249389 A1* | 10/2009 | Katz ................................ | 725/32 |
| 2010/0131986 A1* | 5/2010 | Locker et al. ................... | 725/53 |
| 2010/0333129 A1* | 12/2010 | Alhadeff et al. ................ | 725/27 |
| 2011/0035270 A1 | 2/2011 | Matsunaga | |
| 2011/0225604 A1* | 9/2011 | Bova ............................... | 725/23 |
| 2011/0247042 A1* | 10/2011 | Mallinson ....................... | 725/86 |
| 2011/0321114 A1* | 12/2011 | Newell ........................... | 725/146 |

FOREIGN PATENT DOCUMENTS

| | | |
|---|---|---|
| DE | 44 37 928 | 10/1995 |
| EP | 0 776 132 | 5/1997 |
| EP | 1 308 865 | 5/2003 |
| JP | 2002-24701 | 1/2002 |

(Continued)

*Primary Examiner* — Yassin Alata
(74) *Attorney, Agent, or Firm* — Farjami & Farjami LLP

(57) ABSTRACT

There is provided a system and method for the synchronizing on-air commercial programming with interactive applications, providing interactive content synchronized with on-air television programming. There is provided a system comprising a client device with a display device and an input device and running a synchronization application. The client device receives digital data transmitted from a server, and transmits user feedback information generated from user interactions with the digital data back to the server. The digital data are interactive advertisements, such as online social games, that increase users' awareness of the advertised products or messages. The digital data are delivered to the user's client device in synchronization with the broadcasting of on-air television commercials.

16 Claims, 3 Drawing Sheets

(56) References Cited

FOREIGN PATENT DOCUMENTS

| | | |
|---|---|---|
| JP | 2003-224535 | 8/2003 |
| JP | 2005-333369 | 12/2005 |
| JP | 2005-333402 | 12/2005 |
| JP | 2008-530944 | 8/2008 |
| KR | 10-2010-0006933 | 1/2010 |
| WO | WO 00/76217 | 12/2000 |
| WO | WO 03/015406 | 2/2003 |
| WO | WO 2006/091044 | 8/2006 |
| WO | WO 2011/009175 | 1/2011 |

* cited by examiner

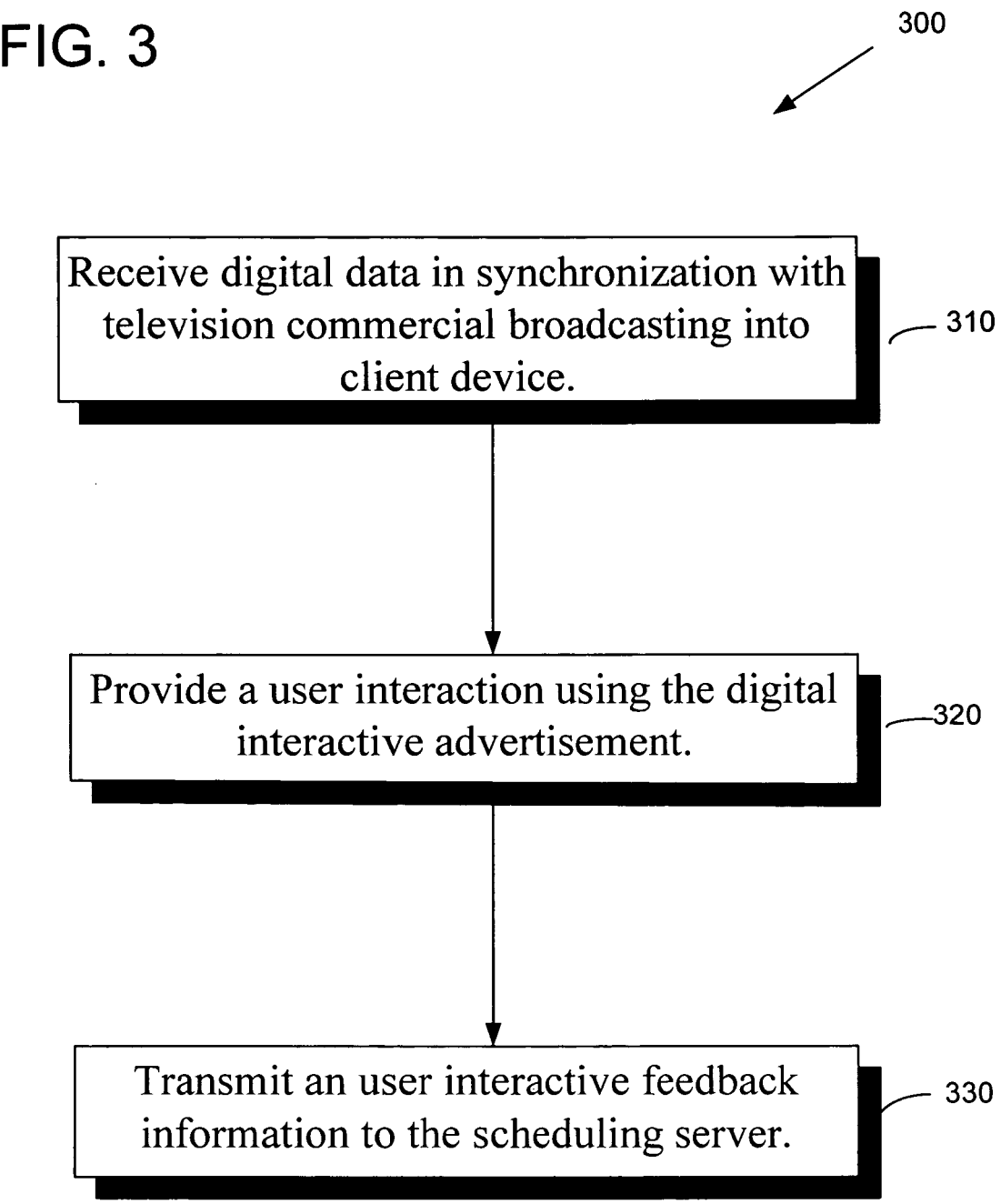

SYSTEM AND METHOD FOR SYNCHRONIZING ON-AIR COMMERCIAL PROGRAMMING WITH INTERACTIVE APPLICATIONS

BACKGROUND OF THE INVENTION

1. Field of the Invention

The present invention relates generally to interactive content. More particularly, the present invention relates to interactive content synchronized with on-air television programming 2. Background Art Interactive television is well known in the art. Interactive television usually allows viewers to interact with the contents related to on-air television programming. For example, reality television shows and game shows are two types of television programming that allow viewers to interact via devices connected to the Internet to affect, for example, the outcome of the show by voting or other interactions. Devices providing on-air television interactivity may include mobile devices such as cell phones, general purpose computing devices such as laptop, desktop, or tablet PCs, integrated IPTVs hosting interactive applications such as Google TV, Direct TV, WebTV and other devices allowing viewers to interact with on-air television programming.

ETV is one well-known example of interactive television. ETV often requires viewers to have a computer connected to the World Wide Web and to be in proximity to a television. During the broadcast of on-air television programming, the user can access program specific Internet website that is synchronized to the on-air television programming, providing much deeper viewer engagement.

While interactive television programs can be a source of excitement for many viewers, viewers may regard commercial breaks during such television programming with less enthusiasm. Indeed, many viewers prerecord television programs to avoid viewing commercials. Unfortunately, this significantly decreases the value of television advertising, a significant financial revenue stream for television networks.

To encourage viewers to pay attention during advertising, it would be beneficial for advertisers to enhance the excitement of commercials. By creating more engaging commercials, advertisers will be able to engage the audience and leave a positive impression towards the advertised products, services, or messages, thereby conducting a more effective marketing campaign.

Accordingly, there is a need to overcome the drawbacks and deficiencies in the art by providing a way to engage the audiences more effectively for advertising related to on-air television content.

SUMMARY OF THE INVENTION

There are provided systems and methods for synchronizing on-air commercial programming with interactive applications, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart describing the steps, according to one embodiment of the present invention, by which on-air commercial programming may be synchronized with interactive applications.

DETAILED DESCRIPTION OF THE INVENTION

The present application is directed to a system and method for the synchronizing on-air commercial programming with interactive applications. The following description contains specific information pertaining to the implementation of the present invention. One skilled in the art will recognize that the present invention may be implemented in a manner different from that specifically discussed in present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments in the invention. To maintain brevity, other embodiments of the invention, which use the principles of the present invention, are not specifically described in the present application and are not specifically illustrated by the present drawings.

Figure 1:
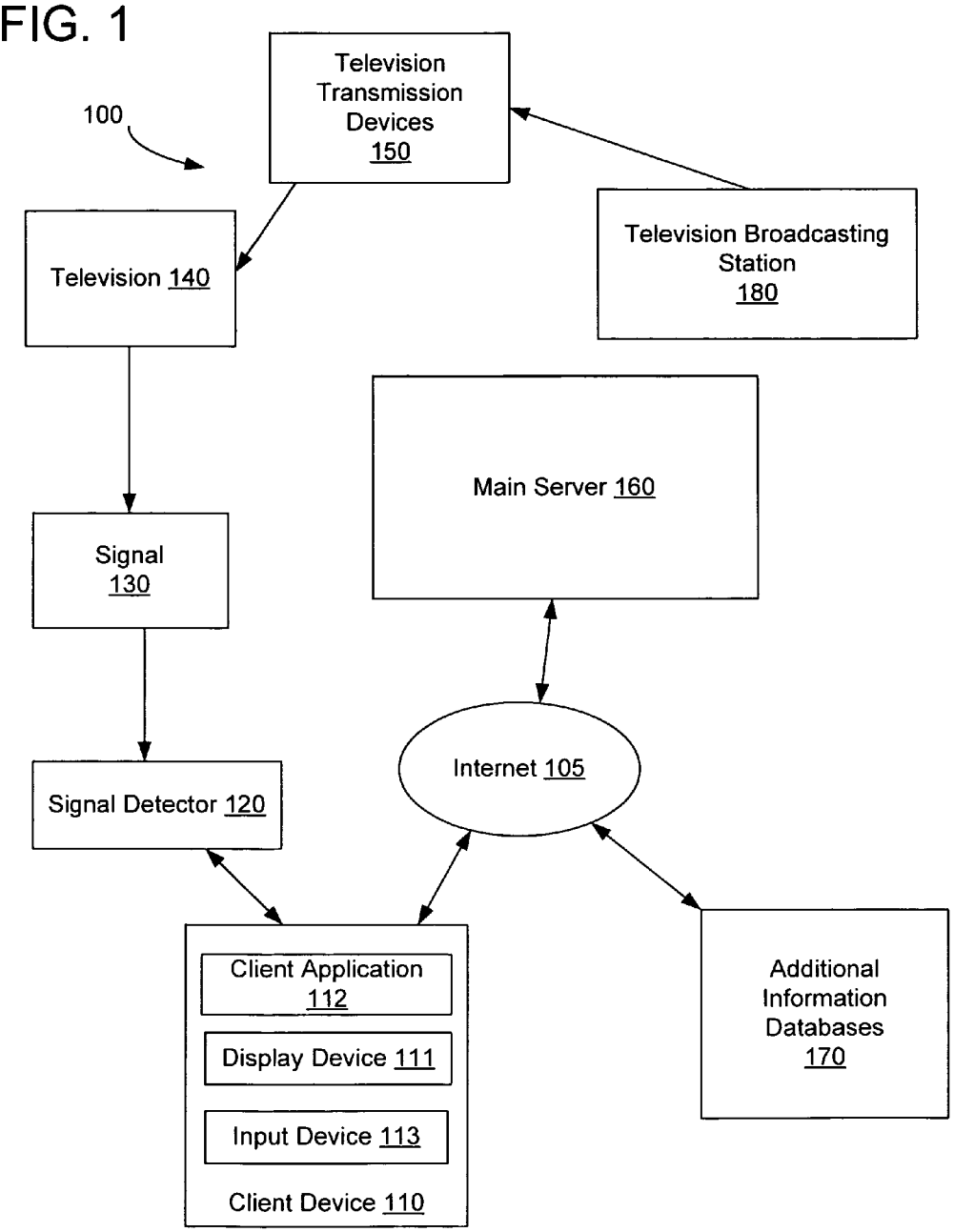
FIG. 1 presents a diagram of a system for implementing the synchronizing on-air commercial programming with interactive applications, according to one embodiment of the present invention.

FIG. 1 presents a diagram of a system for implementing the synchronizing on-air commercial programming with interactive application, according to one embodiment of the present invention. Diagram 100 of FIG. 1 includes Internet 105, client device 110, signal detector 120, signal 130, television 140, main server 160, additional information databases 170, television transmission devices 150, and television broadcasting station 180. Client device 110 includes display device 111, client application 112, and input device 113.

The configuration shown in diagram 100 illustrates the synchronizing on-air commercial programming with interactive applications. Synchronization between on-air commercial programming and client device 110 may commence when client device 110 begins accepting digital data transmitted from main server 160. Main server 160 may begin transmitting digital data to client device 110 at approximately the same time television broadcasting station 180 begins transmitting on-air commercial programming to television 140 through television transmission devices 150. Main server 160 stops transmitting digital data through Internet 105 when television broadcasting station 180 ends broadcasting of on-air commercial programming. An on-air commercial programming is a series of individual commercials broadcasted in tandem. On-air commercial programming is interspersed throughout regular noncommercial television programming. In other embodiments, main server 160 may continue transmitting digital data despite an end to the broadcasting of on-air commercial programming, and a return of normal television programming.

In one embodiment of the invention as shown in FIG. 1, the digital data may be related to products and/or messages advertised in the corresponding on-air commercial programming. For example, a particular commercial may pertain to the selling of luxury automobiles and the corresponding digital data may contain a group of electronic advertisements and discounts related to the purchase of luxury automobiles. Digital data is programmed into main server 160 or uploaded into main server 160 from any other information source, such as a server or database. Digital data transferred across Internet 105 or across any other network system may be encoded for security purposes. In other embodiments, digital data transmitted from main server 160 need not necessarily be related or relevant to the contents of on-air commercial programming.

In one embodiment of the invention as shown in FIG. 1, a single server, main server 160, sends digital data to client device 110 based on geographic location of client device 110. Main server 160 may present different digital data to different geographical locations. For example, client device 110 may receive different digital data as digital data is transported across different states boundaries because each state may have different local affiliates providing different schedules for on-air commercial programming. Thus, main server 160 may be programmed to send different digital data to different geographical locations through Internet 105 or through other network systems. Additionally, main server 160 may be programmed to send same digital data to all geographical locations. In yet other embodiments, main server 160 may be programmed to block transmission of digital data to particular geographic locations, for example to comply with regional licensing restrictions.

In one embodiment of the invention as shown in FIG. 1, main server 160 sends digital data to client device 110 directly through Internet 105. In other embodiments, main server 160 may send digital data to a secondary server. Secondary server may then transmit digital data to client device 110. A secondary server is usually located nearer to client device 110 than main server 160 is located to client device 110. Secondary server may transmit all digital data received from main server 160 to client device 110 immediately or during program specified time intervals.

In one embodiment of the invention as shown in FIG. 1, additional information databases 170 may assist main server 160 with transmitting digital data to client device 110. Additional information databases 170 may store vast numbers of user profile information, such as geographical information, time zone information, Internet 105 protocol addresses, or other online information regarding user and user's client device 110. Main server 160 may access the user profile information through Internet 105 or other types of network systems. By analyzing the user profile information stored in additional information databases 170, main server 160 may better determine when to send digital data to client device 110, geographical location to send digital data to, and which parts of the digital data may be transmitted to client device 110. User profile information stored in additional information databases 170 may be updated, altered or deleted. User profile information in additional information databases 170 may be updated by programming within additional information databases 170 or by uploading information from other sources into additional information databases 170.

In one embodiment of the invention as shown in FIG. 1, client application 112 is a standalone software application that may be downloaded onto client device 110. Client application 112 may be programmed to synchronize client device 110 beginning to accept digital data from main server 160 through Internet 105 with television broadcasting station 180 broadcasting on-air commercial programming broadcasted to television 140 through television transmission devices 150. Client application 112 may be programmed to control when client device 110 may end reception of digital data from main server 160. Moreover, client application 112 may be programmed to control which parts of digital data client device 110 may accept. In one embodiment of the invention as shown in FIG. 1, client application 112 may be configured to allow client device 110, which is ready to receive digital data transmitted from main server 160, to accept, indiscriminately, all digital data transmitted from main server 160. In alternative embodiments of the invention, client application 112 may be configured to allow client device 110 to accept only a subset of the digital data transmitted from main server 160.

In one embodiment of the invention as shown in FIG. 1, client application 112 may be configured in such a manner that client device 110 may not begin accepting digital data until signal detector 120 detects signal 130 from television 140. Signal detector 120 may be located within client device 110, although in other embodiments, signal detector 120 may be externally attached to client device 110 and attachment may be achieved with physical or wireless connection. Client application 112 may be configured to activate signal detector 120 to detect for signal 130. Signal 130 may be emitted from television 140 and may comprise audio frequency, light frequency or any other types of frequencies. In one embodiment of the invention as shown in FIG. 1, signal detector 120 may be configured to detect for signal 130 in the form of audio frequencies emitted from television 140 related to on-air commercial programming. For example, when television 140 begins showing on-air commercial programming, the sound emitted from television 140 may be signal 130, and signal 130 may travel through the air to reach nearby client device 110. When signal detector 120 detects signal 130, signal detector 120 may sends an electronic alert to client application 112, and client application 112 may, in response to receiving an electronic alert, activate client device 110 to begin accepting digital data from main server 160.

In one embodiment of the invention as shown in FIG. 1, client device 110 may stop receiving digital data from main server 160 when main server 160 ends transmission of digital data to client device 110. Main server 160 may end transmission of digital data to client device 110 at any time, such as at the end of the broadcasting of on-air commercial programming from television broadcasting station 180. Main server 160 may also transmit an electronic alert to client device 110 to cause client device 110 to end reception of any further incoming digital data. Furthermore, user may personally deactivate client device 110 which may cause client device 110 to end reception of digital data. In alternative embodiments of the invention, client device 110 may be programmed to end reception of digital data at a particular time.

After client application 112 converts digital data into viewable digital data, display device 111 may display the viewable digital data. For example, viewable digital data may contain advertising information such as digital coupons or special offers. Client application 112, upon receiving such digital data, may convert such digital data into viewable coupons and special offers advertisements and display them through display device 111. Display device 111 should not be limited to any particular hardware type. In one embodiment of the invention as shown in FIG. 1, display device 111 may be a liquid crystal display (LCD) screen built into client device 110. In alternative embodiments of the invention, display device 111 may be another type of display hardware, such as cathode-ray tubes (CRT) monitors. Moreover, display device 111 may be externally attached to client device 110 through physical or wireless connection. In yet other embodiments, display device 111 may also be touch sensitive and may serve as input device 113 as well.

In one embodiment of the invention as shown in FIG. 1, input device 113 may allow the user of client device 110 to interact with digital data presented on display device 111. Input device 113 may be built into client device 110 or may be externally attached to client device 110. In one embodiment of the invention as shown in FIG. 1, input device 130 comprises a miniature QWERTY keyboard built into client device 110. In alternative embodiments, input device 113 may be a miniature keyboard, a touch sensitize virtual keyboard screen or any other type of input hardware. In yet other embodiments, input device 113 may function on voice command or on other physical acts of activation.

User information, which may be generated from user interactions with digital data, may be transmitted to and stored within main server 160 for main server 160 or client device 110 to access at a later time. During user interactions with digital data, client device 110 may also alert main server 160 to transmit user information back to client device 110. User information may be transferred between client device 110 and main server 160 through Internet 105. In other embodiments of the invention, user information may be transmitted between main server 160 and client device 110 through a secondary server or through other network configurations.

In one embodiment of the invention as shown in FIG. 1, main server 160 may also interact with and respond to client device 110 based, partly or wholly, on user information stored on main server 160. For example, main server 160 may maintain a database of coupon offers popular in the past with user of client device 110. Thus, main server 160 may send such popular coupon offers to a user during future interactions with that user through client device 110, in order to increase the likelihood of user accepting and using those coupons.

In this embodiment of the invention, client device 110 may be a non-portable device, such as a personal desktop computer or server. In alternative embodiments, client device 110 may be a mobile device, such as an iPad, iPhone, tablet PC or laptop. In yet other embodiments, client device 110 and television 140 may be combined into a single device.

Figure 2:
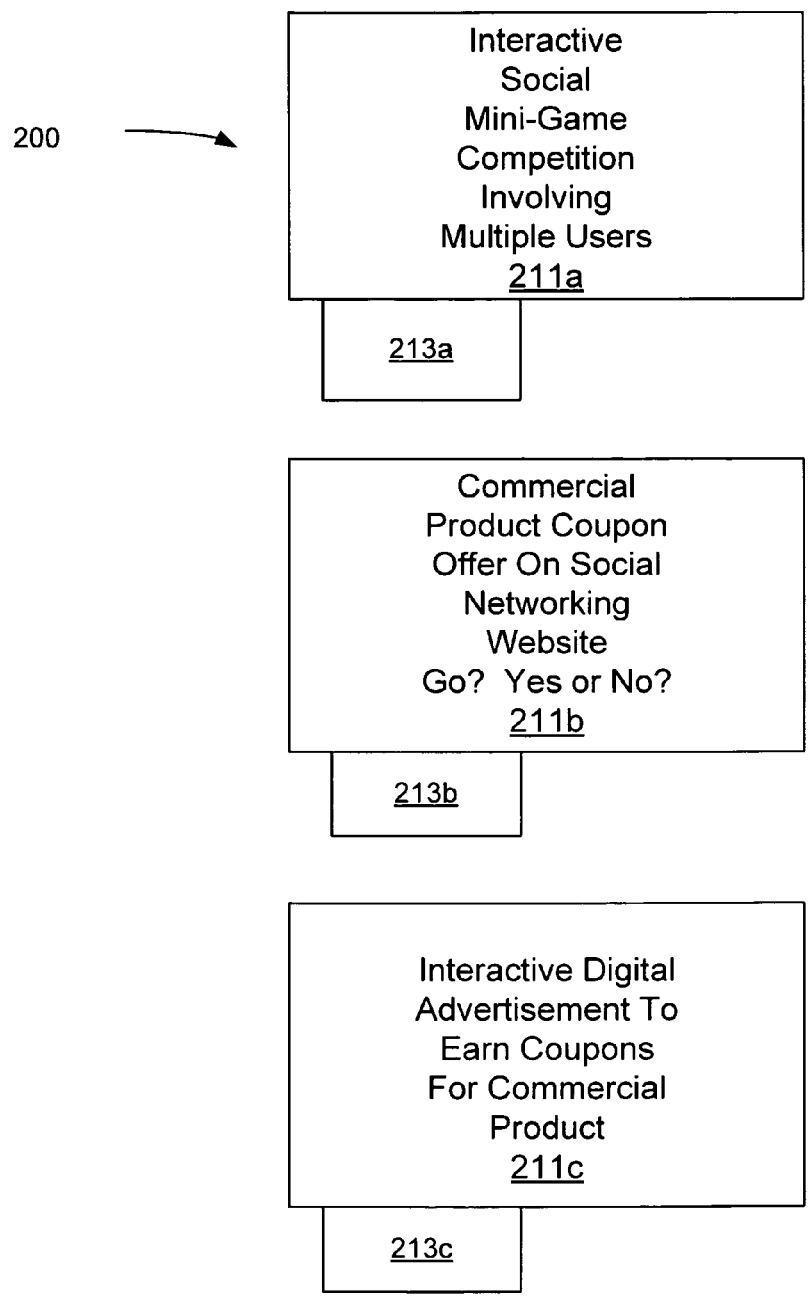
FIG. 2 presents a diagram showing three instances of the user interface presented by the synchronizing on-air commercial programming with interactive applications, according to one embodiment of the present invention.

Moving to FIG. 2, FIG. 2 presents a diagram of three instances of the user interface presented by the synchronizing on-air commercial programming with interactive applications, according to one embodiment of the present invention. Diagram 200 of FIG. 2 includes display device, 211a, 211b, and 211c, and input device 213a, 213b and 213c. Display device 211a, 211b and 211c may each correspond to display device 111 in FIG. 1 and input device 213a, 213b and 213c may each correspond to input device 113 in FIG. 1.

Display device 211a is an alternative embodiment of display device 111 in FIG. 1. Display Device 211a may display an interactive social videogame that allows multiple users of client devices 110 to participate simultaneously. In this interactive social videogame multiple users may compete against each other. Using input device 213a, a user of client device 110 may compete against other users by attempting to answer all given questions correctly and in a shortest amount of time. When main server 160 detects the first user who answers all questions correctly, main server 160 may send coupons and prizes to that user's client device 110, main server 160 may end the previous social videogame, and main server 160 may begin another new social videogame. Before the start of each new social videogame, main server 160 may allocate a couple of minutes towards waiting for more players to join the social videogame. Once the social videogame begins, main server 160 may prevent any additional users from participating in such an ongoing social videogame.

Display device 211b is an alternative embodiment of display device 111 in FIG. 1. Display device 211b may display information regarding an offer to earn coupons for a particular product advertised on on-air commercial programming. Information displayed may present a user with an offer to visit a specific social networking website for a chance to earn coupons. User of client device 110 may accept the offer to visit a specific social networking website, and that user may be directed to the social networking website. Moreover, the social networking website may prompt the user to create an account on the website and answer additional questions before offering any coupons to the user. Additional questions may be related to any topic, including user's personal life or user's opinions towards an advertised product. The user may use input device 213b to accept the request to visit the social networking website and to perform any other further actions required to obtain the coupon offer.

Display device 211c is an alternative embodiment of display device 111 in FIG. 1. Display device 211c may display a digital interactive advertisement that may allow the user to earn coupons for a particular product. In this example, the user may earn one or more coupons by interacting with the digital interactive advertisement. The digital interactive advertisement may require the user to deliver to a number of distinct users by email, an advertisement, as a prerequisite to receiving the coupon. The user may perform the required action through input device 213c. When main server 160 detects that all emails have been sent, main server 160 may electronically deliver a coupon to user's email account and may alert that user of such action through the client device 110. Digital interactive advertisement may be presented to client device 110 during the showing of on-air commercial programming on television 140 and/or beyond such showing.

Moving to FIG. 3, FIG. 3 shows a flowchart describing the steps, according to one embodiment of the present invention, by which the synchronizing on-air commercial programming with interactive application may be provided. Certain details and features have been left out of flowchart 300 that are apparent to a person of ordinary skill in the art. For example, a step may comprise one or more sub-steps or may involve specialized equipment or materials, as known in the art. While steps 310 through 330 indicated in flowchart 300 are sufficient to describe on embodiment of the present invention, other embodiments of the invention may utilize steps different from those shown in flowchart 300.

Referring to step 310 of flowchart 300 in FIG. 3 and diagram 100 of FIG. 1, step 310 of flowchart 300 comprises client application 112 in client device 110 receiving digital data from main server 160. In one embodiment of the invention as shown in FIG. 1, client application 112 may be configured to allow client device 110 to accept digital data only if signal detector 120 detects proper signal 130 emitted from television 140. When signal detector 120 detects signal 130 emitted from television 140, signal detector 120 may send an electronic alert to client application 112, and client application 112 may activate client device 110 to accept digital data. Client application 112 may store information received from main server 160 into memory storage within client device 110. In alternative embodiments of the invention in FIG. 1, as described previously, client device 110 may be configured to accept digital data from main server 160 without requiring signal detector 120 to detect signal 130.

Referring to step 320 of flowchart 300 in FIG. 3 and diagram 100 of FIG. 1, step 320 of flowchart 300 comprises client application 112, client device 110 and display device 111 providing an interactive environment for the user through display device 111 using digital data received in step 310. In one embodiment of the invention as shown in FIG. 1, step 320 may occur after client device 110 receives digital data transmitted from main server 160. Thus, referring to diagram 200 of FIG. 2, after step 310, display device 111 may appear similar to display device 211b, in which the user may have an opportunity to access a website, such as a social networking website, a broadcaster website or an advertiser website, in order to claim coupons and prizes. As previously described, digital data may provide an interactive environment, which may allow the user to visit the social networking site and to perform other actions in order to claim the coupon or prize.

Referring to step 330 of flowchart 300 in FIG. 3 and diagram 100 of FIG. 1, step 330 of flowchart 300 comprises client device 110 and main server 160. In one embodiment of this invention shown in FIG. 1, client device 110 may transmit user feedback information generated from interaction received after step 320 between user and interactive environment to main server 160. Thus, referring to diagram 200 of FIG. 2, after step 310, display device 111 may appear similar to display device 211b, where the user may be prompted to go to a social networking website to claim product coupons and prizes. When user accepts or declines access to the social networking website, this action may generate user feedback information and this feedback information may be transmitted from client device 110 to main server 160. As stated earlier, this interactive feedback information may be stored on main server 160. Subsequent information gathered from user interactions within the social networking website may also be transmitted to main server 160. As described earlier, main server 160 may use the user feedback information to determine when to present coupons or prizes to the user.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A method for synchronizing interactive application content with broadcasting program information, the method comprising:
    receiving a signal emitted from a television receiving and televising a broadcast from a television broadcasting station;
    enabling a reception of a digital data from a server by a computing device not receiving the broadcast from the television broadcasting station, in response to the receiving of the signal without transmitting to the server a request for the digital data, without transmitting to the server any portion of the signal emitted from the television, and without transmitting to the server any information generated from the signal emitted from the television, the digital data being separate from the broadcast by the television broadcasting station;
    receiving the digital, data from the server by the computing device in synchronization with an on-air commercial programming being received by the television;
    providing an interactive environment on a display of the computing device using the digital data;
    transmitting a user feedback information generated from a user action within the interactive environment to the server; and
    disabling the reception of the digital data by the computing device in synchronization with a return of regular noncommercial programming through the television transmitted from the television broadcasting station.

2. The method of claim 1 wherein the signal comprises audio or light emitted from the television.

3. The method of claim 1, wherein the digital data is an offer to win coupons or other prizes by accessing a social networking website, a broadcaster website or an advertiser website to claim coupons or other prizes.

4. The method of claim 1, wherein the digital data comprises a social game allowing multiple users to compete for coupons or prizes.

5. The method of claim 1, wherein the computing device comprises an application allowing a user to send product coupons or prizes to other users.

6. The method of claim 1, wherein the computing device comprises an application allowing a user of the computing device to communicate with other users in order to persuade them to buy a product.

7. The method of claim 1, wherein the digital data comprises an interactive advertisement prompting a user with questions to answer before allowing the user to claim coupons or prizes.

8. The method of claim 1, wherein the digital data comprises a single-player game that allows a user to win coupons if the user wins the game.

9. A computing device for synchronizing interactive application content with broadcasting program information, the computing device comprising:
    a display screen;
    the computing device configured to:
        receive a signal emitted from a television receiving and televising a broadcast from a television broadcasting station;
        enable a reception of a digital data from a server by a computing device not receiving the broadcast from the television broadcasting station, in response to receiving the signal without transmitting to the server a request for the digital data, without transmitting to the server any portion of the signal emitted from the television, and without transmitting to the server any information generated from the signal emitted from the television, the digital data being separate from the broadcast by the television broadcasting station;
        receive the digital data from the server by the computing device in synchronization with an on-air commercial programming being received by the television;
        provide an interactive environment on a display of the computing device using the digital data;
        transmit a user feedback information generated from a user action within the interactive environment to the server; and
        disable the reception of the digital data by the computing device in synchronization with a return of regular noncommercial programming through the television transmitted from the television broadcasting station.

10. The computing device of claim 9, wherein the signal comprises audio or light emitted from the television.

11. The computing device of claim 9, wherein the digital data is an offer to win coupons or other prizes by accessing a social networking website, a broadcaster website or an advertiser website to claim coupons or other prizes.

12. The computing device of claim 9, wherein the digital data comprises a social game allowing multiple users to compete for coupons or prizes.

13. The computing device of claim 9 further comprising an application allowing a user to send product coupons or prizes to other users.

14. The computing device of claim 9 further comprising an application allowing a user of the computing device to communicate with other users in order to persuade them to buy a product.

15. The computing device of claim 9, wherein the digital data comprises an interactive advertisement prompting a user with questions to answer before allowing the user to claim coupons or prizes.

16. The computing device of claim 9, wherein the digital data comprises a single-player game that allows a user to win coupons if the user wins the game.

* * * * *